US006931645B2

(12) United States Patent
Murching et al.

(10) Patent No.: US 6,931,645 B2
(45) Date of Patent: Aug. 16, 2005

(54) METHODS AND SYSTEMS FOR CANCELING REQUESTS FOR THE TRANSMISSION OF DATA

(75) Inventors: Arvind Murching, Issaquah, WA (US); Nk Srinivas, Issaquah, WA (US); Jameel Hyder, Sammamish, WA (US); Vadim Eydelman, Redmond, WA (US); Abolade Gbadegesin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 09/738,494

(22) Filed: Dec. 15, 2000

(65) Prior Publication Data

US 2002/0078250 A1 Jun. 20, 2002

(51) Int. Cl.[7] .................................................. G06F 3/00
(52) U.S. Cl. ........................ 719/321; 719/313; 719/328; 710/5
(58) Field of Search ........................ 719/311–313, 320, 719/321, 328; 710/5; 709/310, 321, 328; 707/2

(56) References Cited

U.S. PATENT DOCUMENTS

| | | | |
|---|---|---|---|
| 5,412,803 A | | 5/1995 | Bartow et al. |
| 6,052,772 A | | 4/2000 | Kark et al. |
| 6,119,167 A | * | 9/2000 | Boyle et al. ................. 709/234 |
| 6,178,464 B1 | * | 1/2001 | Knight et al. ................ 709/328 |
| 6,192,376 B1 | | 2/2001 | Kincaid et al. |
| 6,219,758 B1 | * | 4/2001 | Navarro et al. .............. 711/137 |
| 6,374,233 B1 | * | 4/2002 | Gardner .......................... 707/2 |
| 6,418,464 B1 | * | 7/2002 | Minow ......................... 709/203 |
| 6,515,999 B1 | * | 2/2003 | Nagami et al. .............. 370/409 |
| 6,519,665 B1 | * | 2/2003 | Arimilli et al. .............. 710/110 |
| 6,549,934 B1 | | 4/2003 | Peterson et al. |

OTHER PUBLICATIONS

Namgoong et al. "Improved hard acknowledgment deadline protocol in real–time RPC" EUROMICRO Conference, 1999. Proceedings. 25th, vol. 2. pp.: 375–382.*

* cited by examiner

Primary Examiner—Meng-Al T. An
Assistant Examiner—Van Hoa Nguyen
(74) Attorney, Agent, or Firm—Microsoft Corp.

(57) ABSTRACT

Methods are provided that allow high-level protocol drivers to cancel transmission requests that have been sent to low-level protocol drivers. Transmission requests are assigned cancel identifiers. Because one original request may be divided into several packets for transmission, the same cancel identifier is given to every packet that derives from the original request. High-level protocol drivers can request cancellation of all pending requests whose cancel identifiers match the one indicated. Cancel identifiers generated by different high-level protocol drivers are mutually distinct so one protocol driver cannot inadvertently cancel requests made by another. The protocol driver may divide its requests into logical flows and assign the same cancel identifier to all requests within one flow. Then, the protocol driver may cancel all pending requests within one flow while allowing requests in other flows to proceed to transmission. An application can use these methods to cancel requests sent to high-level protocol drivers.

15 Claims, 6 Drawing Sheets

Figure 4A:
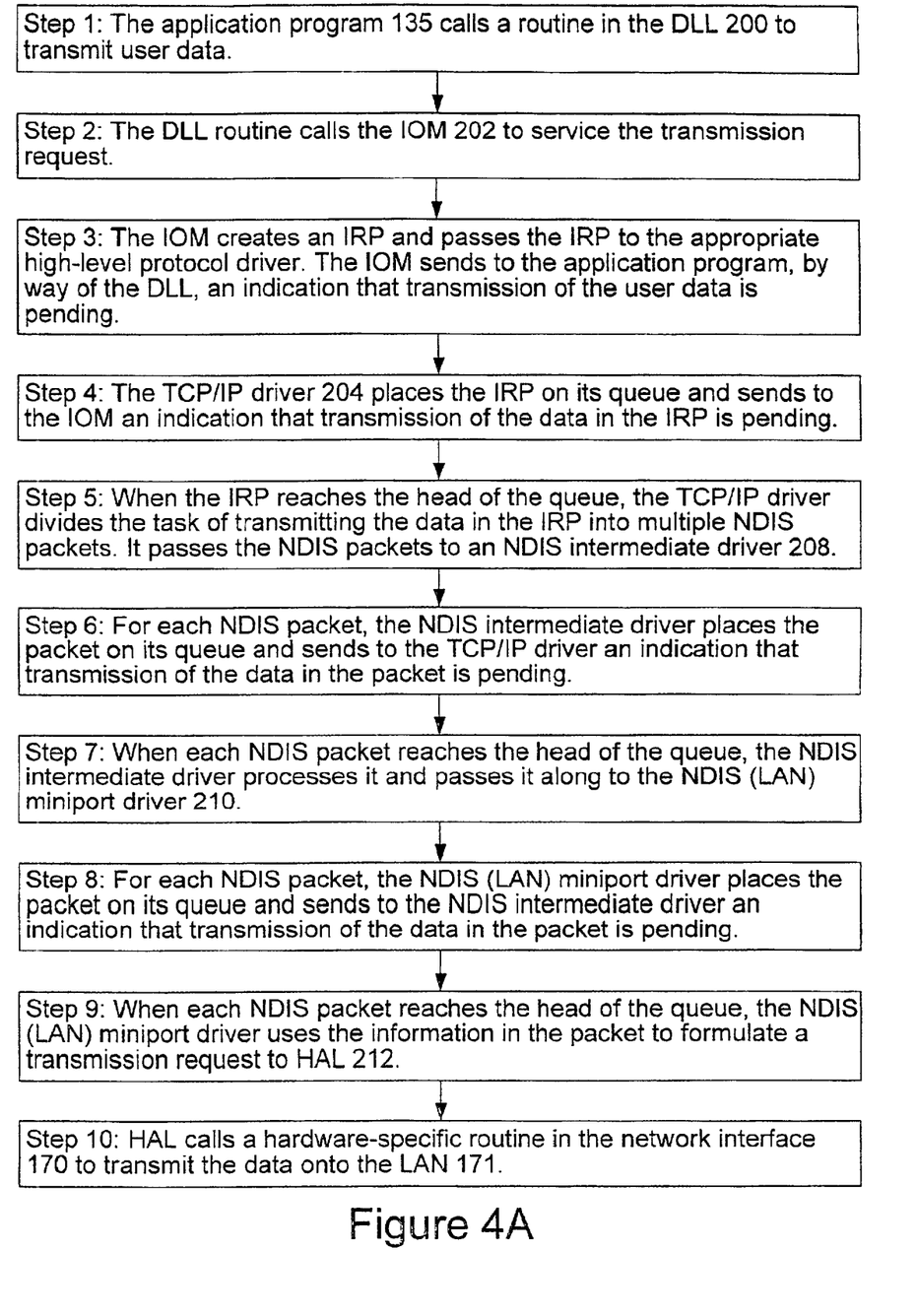
FIG. 4A is a flow diagram illustrating what happens when a request to transmit data is serviced by means of multiple subsidiary requests.
Figure 4B:
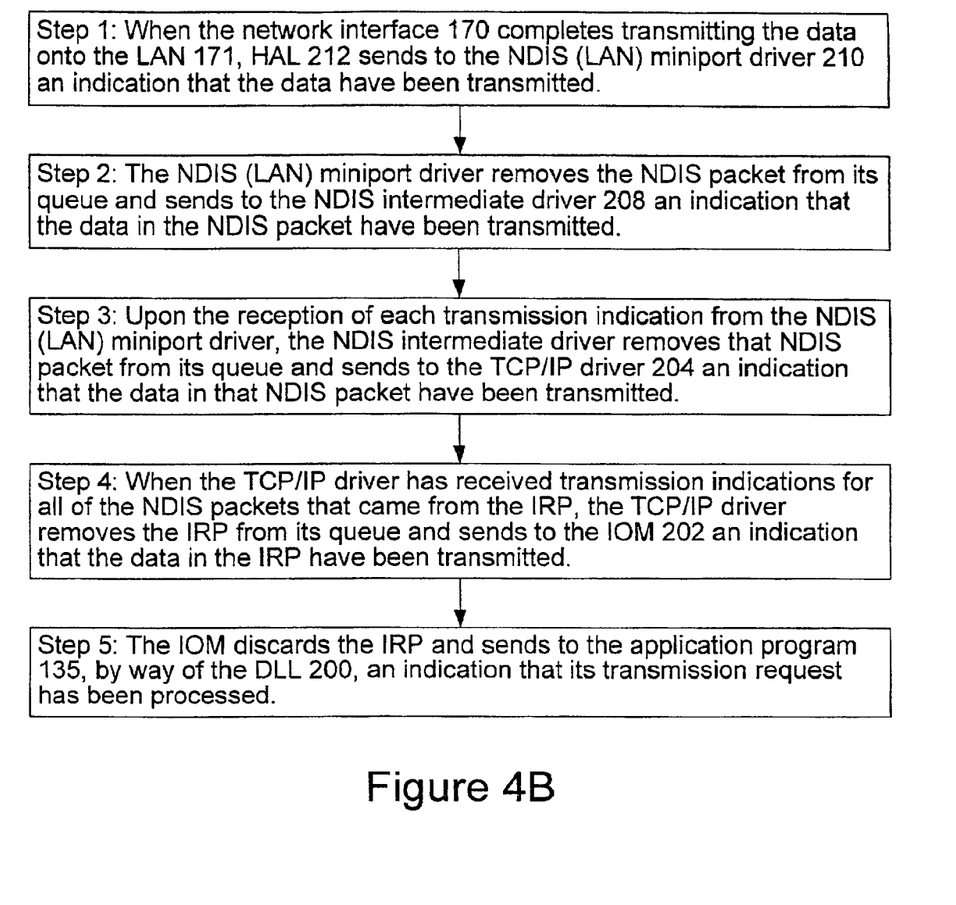
FIG. 4B is a flow diagram illustrating the steps in completing the data transmission request of FIG. 4A.

Step 1: When the network interface 170 completes transmitting the data onto the LAN 171, HAL 212 sends to the NDIS (LAN) miniport driver 210 an indication that the data have been transmitted.

↓

Step 2: The NDIS (LAN) miniport driver removes the NDIS packet from its queue and sends to the NDIS intermediate driver 208 an indication that the data in the NDIS packet have been transmitted.

↓

Step 3: Upon the reception of each transmission indication from the NDIS (LAN) miniport driver, the NDIS intermediate driver removes that NDIS packet from its queue and sends to the TCP/IP driver 204 an indication that the data in that NDIS packet have been transmitted.

↓

Step 4: When the TCP/IP driver has received transmission indications for all of the NDIS packets that came from the IRP, the TCP/IP driver removes the IRP from its queue and sends to the IOM 202 an indication that the data in the IRP have been transmitted.

↓

Step 5: The IOM discards the IRP and sends to the application program 135, by way of the DLL 200, an indication that its transmission request has been processed.

Figure 4B

METHODS AND SYSTEMS FOR CANCELING REQUESTS FOR THE TRANSMISSION OF DATA

TECHNICAL FIELD

The present invention relates generally to computer communications, and, more particularly, to canceling pending requests for the transmission of data.

BACKGROUND OF THE INVENTION

In many implementations of data communications, an application that transmits data does not place its data directly onto the communications link provided by its host computer. Instead, the application passes the data in packets to a high-level protocol driver which manipulates the packets and then passes them down to a low-level driver. The low-level protocol driver may also manipulate the packets before passing them on to a hardware driver which delivers the data to the communications link. This stack of protocol drivers adds delays between when the application requests that data be transmitted and when the data are actually put onto the communications link. Another possible source of transmission delays is the traffic shaper. This protocol driver component tries to ensure that each packet of data is transmitted in a manner that meets the Quality of Service (QoS) requirements of that packet. For example, some packets are only useful if they are transmitted before a specific time. The traffic shaper may allow these time-critical packets to be transmitted while delaying the transmission of any waiting non-time-critical packets. This may delay the transmission of the non-time-critical packets by a second or more.

It may happen during these transmission delays, that the application or a high-level protocol driver decides to cancel the transmission of one or more data packets. For instance, the application may have been shut down or the computer may be rebooting. In these cases, there is no reason to try to transmit the packets. Some operating systems do not provide a mechanism allowing the cancellation of packets pending transmission, however, and before the application can be shut down or the computer rebooted, the pending packets must proceed through the stack of protocol drivers and be sent out onto the communications link. Waiting for the packets to be transmitted causes unnecessary delays just at a time when delays may be unacceptable.

Microsoft's "WINDOWS" operating system provides a mechanism for canceling pending packets. When an application requests that data be transmitted, the request is captured in an Input/Output Request Packet (IRP) which is sent to a high-level protocol driver. The high-level protocol driver translates the IRP into one or more Network Driver Interface Specification (NDIS) packets which are sent down to a low-level protocol driver. While pending IRPs may be canceled, NDIS packets are not currently cancelable. Thus, a request to cancel an IRP waits until all the NDIS packets generated from the IRP complete their transmit processing. This leads to the same result as above: time is spent waiting for the completion of the transmit processing of now meaningless packets.

Some operating systems allow an application or a high-level protocol driver to cancel the transmission of all pending packets. While that may be sufficient in some cases, its inflexibility is inappropriate to other circumstances. For example, an application may be transmitting several logical packet flows across a network. The flows may have different QoS requirements or be sent to different locations. Faced with network congestion, the application or a high-level protocol driver may decide that it is necessary to cancel the transmission of packets in one flow in order to allow packets in the other flows to proceed. Current mechanisms, however, do not allow the selective cancellation of pending transmit packets.

SUMMARY OF THE INVENTION

The above problems and shortcomings, and others, are addressed by the present invention, which can be understood by referring to the specification, drawings, and claims. The invention allows a high-level protocol driver to cancel data transmission requests (which may be in the form of, e.g., packets or IRPs) that have been sent to a low-level protocol driver. Transmission requests are assigned cancel identifiers. Because one original transmission request may be divided into several packets for transmission, the invention associates the same cancel identifier with every packet that derives from the original transmission request. The high-level protocol driver can request the cancellation of all pending requests whose cancel identifiers match the one indicated. The invention also ensures that cancel identifiers generated by different high-level protocol drivers are mutually distinct so that one high-level protocol driver cannot inadvertently cancel requests made by another.

The high-level protocol driver may choose to not give each transmission request a distinct cancel identifier. It may instead divide the transmission requests into logical flows and assign the same cancel identifier to all requests within one flow. Then, the protocol driver may cancel all pending requests within one flow while allowing requests in other flows to proceed to transmission.

The invention may also be practiced by an application to cancel transmission requests sent to a high-level protocol driver.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. The following description is based on possible embodiments of the invention and should not be taken as limiting the invention in any way.

Overview of a General-purpose Computer

Figure 1:
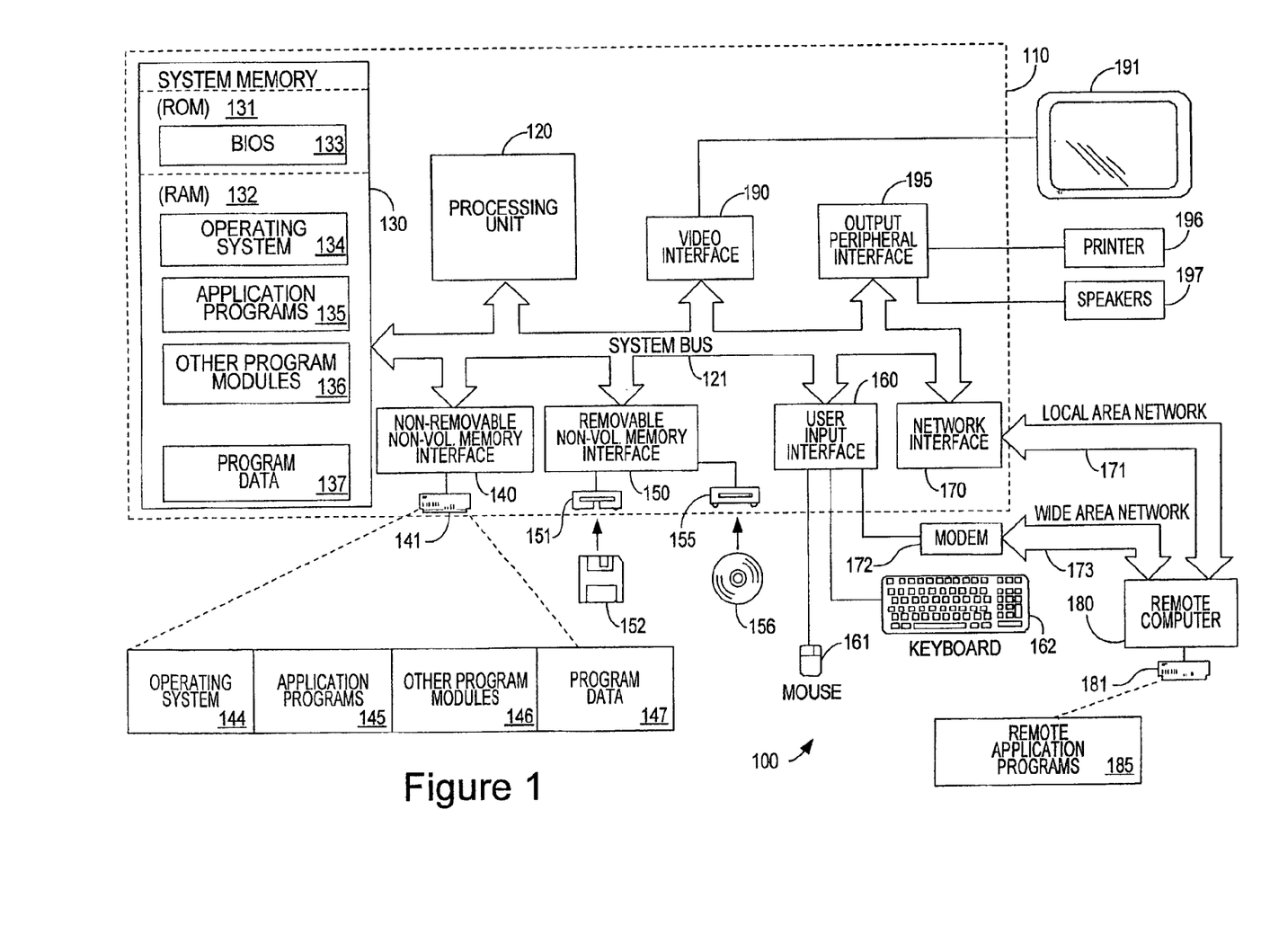
FIG. 1 is a block diagram generally illustrating an exemplary computer system that may support the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include volatile/nonvolatile and removable/non-removable media. By way of example, and not limitation, computer-readable media may include computer storage media and communications media. Computer storage media include volatile/nonvolatile and removable/non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to application programs 135 by way of one or more application programming interfaces (APIs) (not shown). Because the operating system 134 incorporates these services, developers of application programs 135 need not redevelop code to use the services. Examples of APIs provided by operating systems such as Microsoft's "WINDOWS" are well-known in the art.

The computer 110 may also include other removable/non-removable, volatile/nonvolatile computer storage media. By way of example only, FIG. 1 illustrates a hard disk drive 141 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a Universal Serial Bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a Network Interface Card (NIC) or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

An Exemplary Environment for Network Operations

The invention concerns canceling data packets while they are pending transmission. It will typically be practiced in the context of a multi-level hierarchy of drivers, where the drivers work together to service input/output (I/O) requests. This section and the next set the stage for a discussion of packet cancellation by providing a quick overview of how a computer may provide multi-level I/O services in a networking environment. While this discussion is at times quite specific, the invention is not limited by the details of the discussed embodiment. In particular, the invention need not be practiced with a LAN connection nor in a networking environment.

Figure 2:
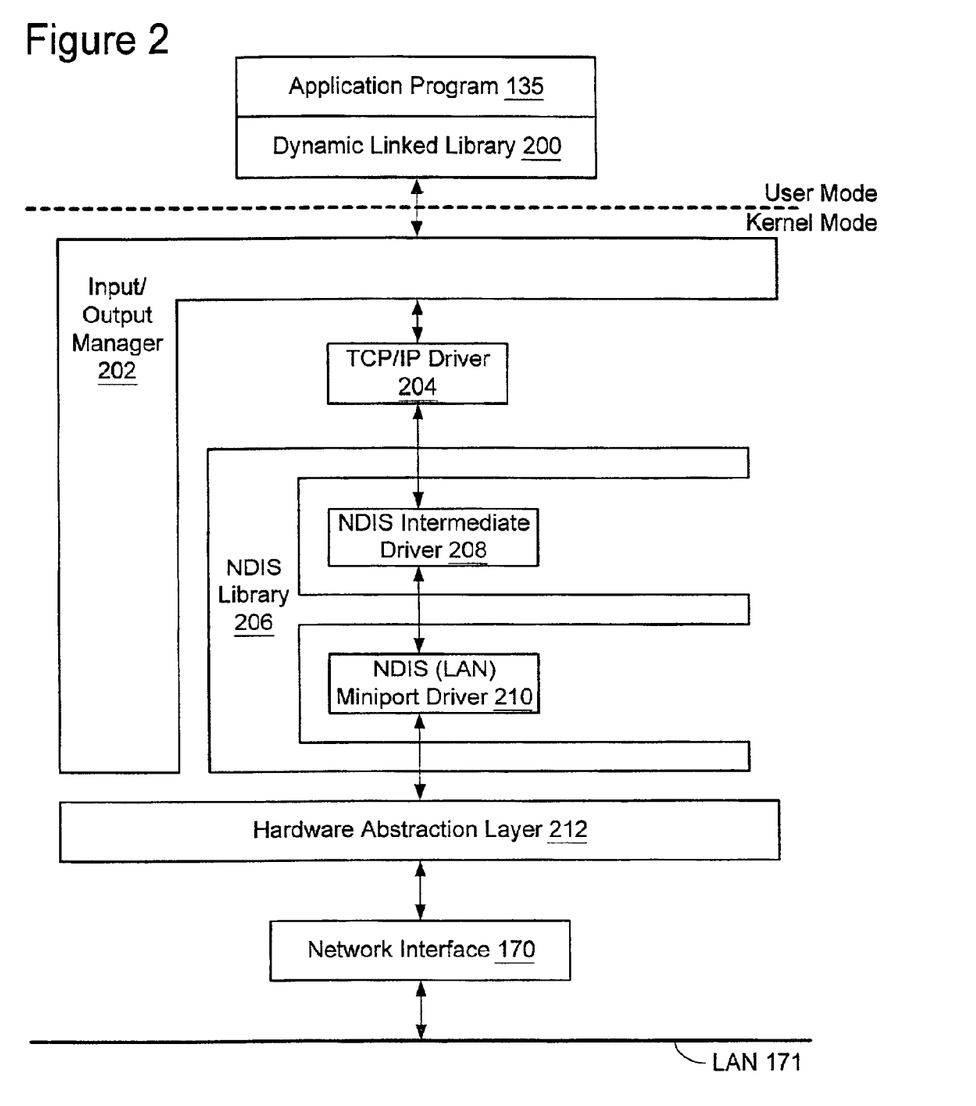
FIG. 2 is a block diagram showing the functional elements of one possible mechanism for supporting network operations on a computer.

FIG. 2 is a block diagram showing the functional elements of one embodiment of a mechanism for providing network services on the computer 110 of FIG. 1. FIG. 2 is based on the internal workings of Microsoft's "WINDOWS NT" operating system, but the Figure and the following discussion abstract the functional elements to focus only on those elements pertinent to the present invention. For example, because the invention is concerned with transmitting data, there is no discussion of how received packets are processed. After describing these components at a high level, the discussion turns to how these components interact to transmit data for an application program.

When a computer user runs an application program 135, it sometimes becomes necessary for that program to communicate with a remote computer 180 or with remote services. Rather than force every application program to include communications software, the computer 110 provides communications services to the application program by means of routines in a dynamic linked library (DLL) 200. The application program calls a DLL routine to perform a communications request and the DLL routine in turn calls on the services of the Input/Output manager (IOM) 202.

The IOM 202 provides I/O functionality to DLL routines. It coordinates all of the disparate elements in the hierarchy of drivers shown in FIG. 2. As part of this coordination, the IOM creates an I/O Request Packet (IRP) that captures the details of the application program's transmission request. The IOM routes the request from driver to driver as each driver performs its part in servicing the request. The IOM also contains common routines usable by many of the drivers. Consolidating this code into the IOM makes the drivers less complex and more compact.

The TCP/IP driver 204 is one example of a high-level protocol driver. It communicates with its peer TCP/IP driver on the remote computer 180 to coordinate and control aspects of networking such as ensuring that data are transmitted correctly, in order, and without gaps or errors. The TCP/IP driver does not communicate directly with the remote computer but calls routines in the Network Driver Interface Specification (NDIS) Library 206 to perform its requests.

The NDIS Library 206 provides standard interfaces that isolate its intermediate drivers 208 and miniport drivers 210 from the details of the operating system. This allows the drivers to be ported from one operating system to another. The NDIS library performs as much common processing as possible to allow its drivers to be small and to focus on the specific aspects of one networking topology. In general, NDIS provides to high-level protocol drivers a standard view of networking while giving the computer 110 the flexibility to use many different networking topologies, possibly at the same time.

NDIS intermediate drivers 208 process data before sending them to other drivers, such as to NDIS miniport drivers 210. NDIS intermediate drivers are not used in every communications task, but they can serve important functions including filtering, traffic shaping, implementing specialized protocols, etc.

An NDIS miniport driver 210 translates its input, I/O requests for a generic type of port, into commands more suited to the topology of the interface it supports. In the example of FIG. 2, the miniport driver converts generic I/O requests into LAN commands.

The Hardware Abstraction Layer 212 provides a bridge between logical I/O functions and the implementation details of particular hardware platforms, such as a particular manufacturer's LAN NIC 170. It provides NDIS miniports 210 with a standard interface to hardware resources.

Transmission Data Flows Within the Exemplary Network Environment

Figure 3A:
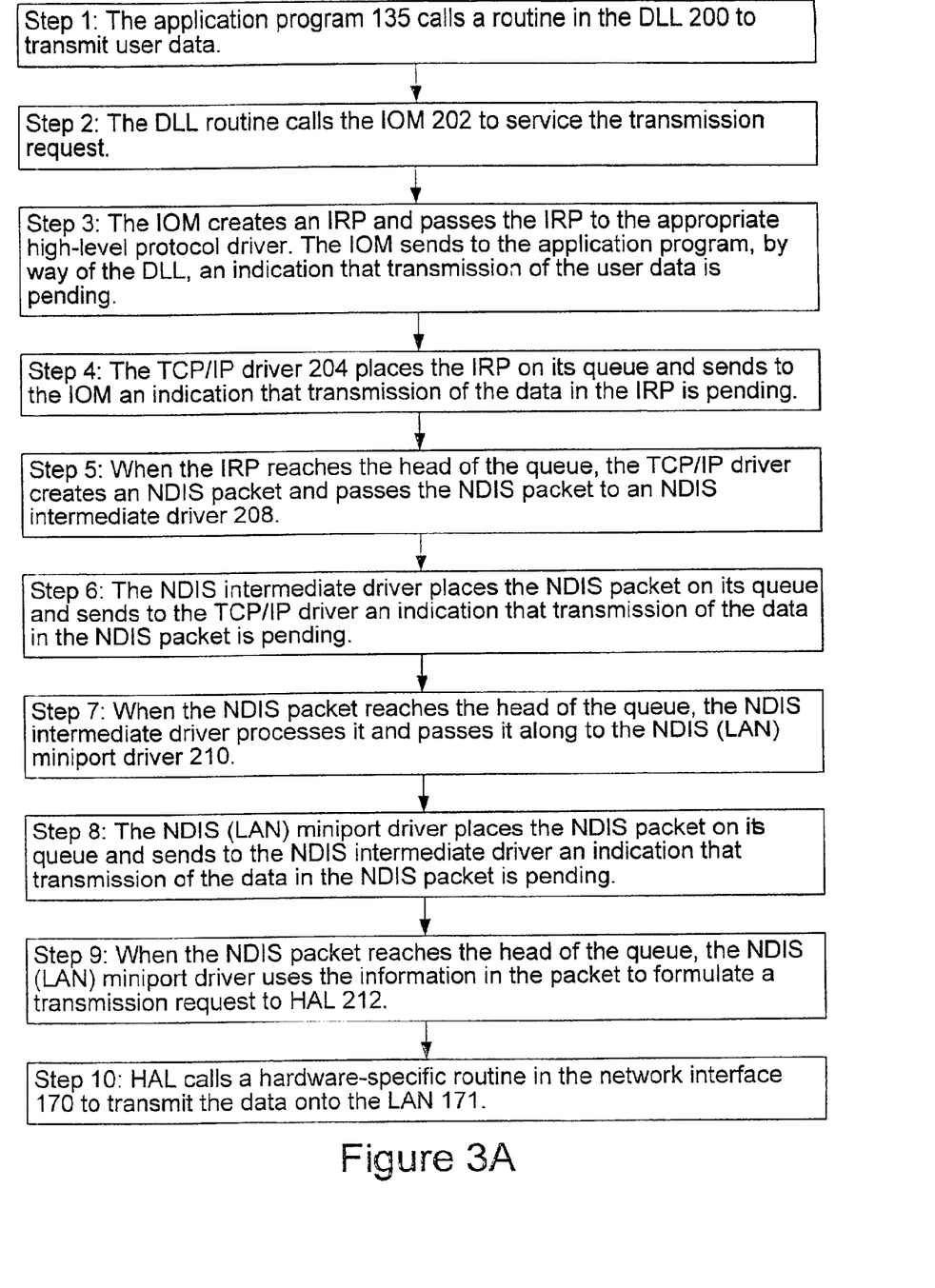
FIG. 3A is a flow diagram illustrating how a typical request to transmit data is processed.

FIG. 3A shows how the elements of FIG. 2 combine to service an application program's data transmission request. The steps in the Figure are self-explanatory and this discussion only offers a few comments.

Note that as the data transmission request passes down the hierarchy of drivers, it is first encapsulated in an IRP (Step 3) and then becomes an NDIS packet (Step 5). That transformation reflects this particular embodiment. In some embodiments, the IRP itself can be passed from driver to driver for processing.

At several stages in the processing, the request is queued (Steps 4, 6, and 8). Generally, the request is not processed until it reaches the head of the queue (Steps 5, 7, and 9), that is to say, until all previous requests have been processed. Time spent in these queues constitutes a large part of the delay between when the application program 135 requests the transmission and when the data are actually put onto the LAN 171.

Drivers do not wait while the drivers below them process the request. Instead, after sending the request down for further processing, they indicate to processes higher in the hierarchy that the request is in progress (Steps 3, 4, 6, and 8) and then go on to other work. The higher-level processes use these indications to track the progress of the request. When the request is completely processed, a separate indication is sent up the driver hierarchy. One mechanism for indicating the completion of a transmission request is explained below with reference to FIG. 3B.

In many cases, the services of the NDIS intermediate driver 208 are not necessary. Steps 6 and 7 are then omitted and, in Step 5, the TCP/IP driver 204 passes the NDIS packet directly to the NDIS (LAN) miniport driver 210.

As the request works its way down the driver hierarchy, it may be processed in many ways. That processing is not pertinent to the present invention so this discussion ignores it.

Figure 3B:
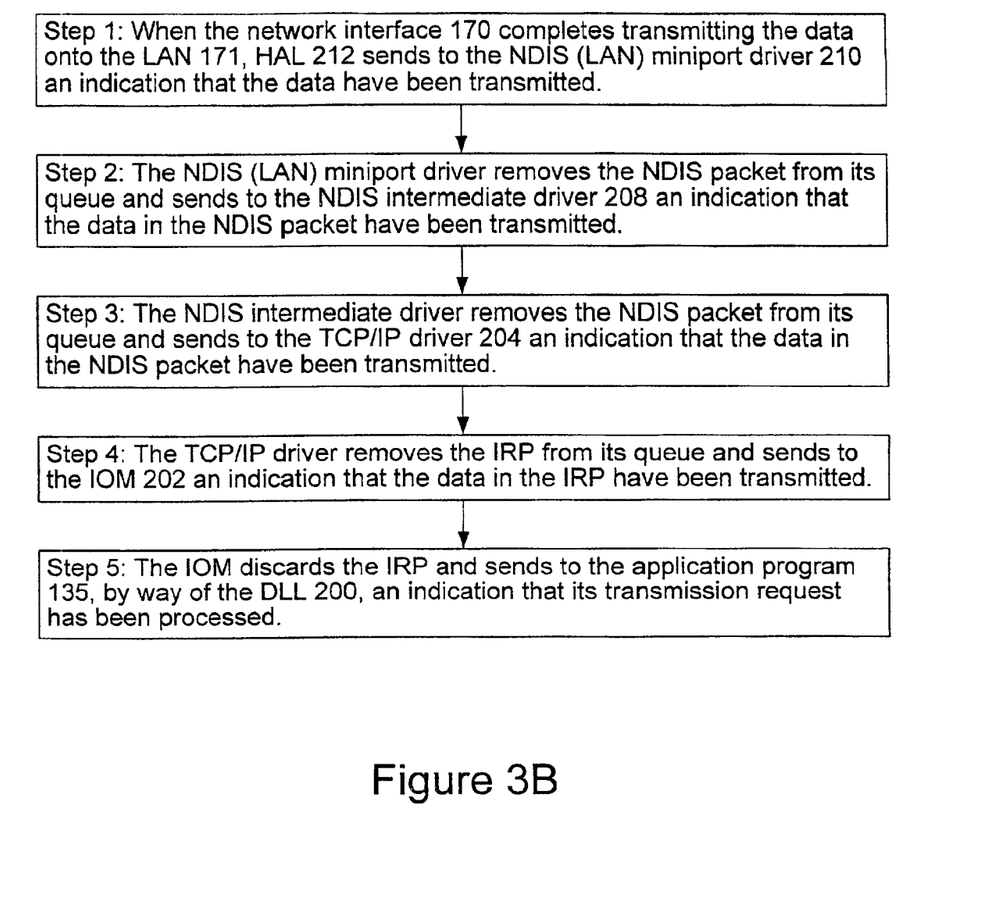
FIG. 3B is a flow diagram illustrating the steps in completing the data transmission request of FIG. 3A.

FIG. 3B shows one way in which the elements described with respect to FIG. 2 complete the final steps in processing the data transmission request. After the data are transmitted onto the LAN 171 in Step 10 of FIG. 3A, the procedure of FIG. 3B is invoked. Generally speaking, at each level in the hierarchy, the process receives the transmission completion message from the process below it in the hierarchy, completes its own processing, cleans up its queues (if any), and then informs the process at the next higher level. Note that the process at each level can only complete its work upon receiving the completion notice from the process below it. In Step 2, the lowest level driver, the NDIS (LAN) miniport 210, completes its work upon receiving the completion notice from the network interface 170. In Step 4, the highest level driver, the TCP/IP driver 204, informs the IOM 202 that the processing of the IRP is complete. In Step 5, the IOM discards the IRP and informs the application program 135 that the data transmission request has been processed.

Canceling a Pending Data Transmission Request

The discussion so far follows the usual case in which an application program's request for the transmission of data is processed until the data are transmitted and the application program is informed of that fact. Sometimes, however, after the application program makes the data transmission request (Step 1 in FIG. 3A) but before the data are actually transmitted (Step 10), a need may arise to cancel the pending request. For example, the application may terminate unexpectedly or the computer system may be rebooting.

Methods existing prior to the instant invention allow for canceling IRPs pending transmission. However, these methods do not allow for canceling the NDIS packet that results from the IRP (Step 5 in FIG. 3A). Therefore, the TCP/IP driver 204 must wait until that NDIS packet is processed by the processes below the TCP/IP driver. The TCP/IP driver waits until it receives notification that processing of the NDIS packet is complete (Step 3 of FIG. 3B). Only then can it remove the IRP from its queue and pass to the IOM the indication that the IRP cancellation is complete. This waiting may occupy a significant amount of time, depending upon the length of the queues in the NDIS intermediate and miniport drivers and on the speed of the transmission link.

The present invention shortens these cancellation delays by enabling high-level protocol drivers (or applications) to cancel all requests stemming from the original data transmission request. In the embodiment of FIGS. 2 and 3, the invention allows the TCP/IP driver 204 to cancel the NDIS packets resulting from the IRP so that the TCP/IP driver need not wait for the NDIS packets to be completely processed by the lower-level drivers.

According to one embodiment of the invention, at Step 5 of FIG. 3A, and before passing down the NDIS packet, the TCP/IP driver 204 creates a cancel identifier and puts that cancel identifier into the header of the NDIS packet. The cancel identifier accompanies the NDIS packet through all its processing in the hierarchical driver stack. If the TCP/IP driver is called upon to cancel the transmission of the IRP, it requests that all lower-level drivers cancel the NDIS packets that resulted from the IRP. In the cancellation request, the TCP/IP driver identifies which NDIS packets to cancel by the cancel identifier it earlier stored in the NDIS packet's header.

The computer 110 may be running several high-level protocol drivers in parallel. If the ranges assigned to cancel identifiers by different drivers overlap, then one driver could inadvertently cancel the transmission requests made by another driver. One embodiment of the present invention avoids this problem by dividing the cancel identifier into two parts. By making the first part specific to one particular driver, this embodiment prevents the cancel identifiers assigned by one driver from overlapping with those assigned by another driver.

The second part of the cancel identifier (which may be the only part in embodiments on computers that run only one high-level driver) may be chosen to be unique within the context of the driver. However, that need not be the case. The driver may instead use cancel identifiers to divide traffic into logical entities. For example, a driver may assign the same cancel identifier to all packets within one data flow. If, because of congestion or other problems, the driver decides to cancel transmission of packets within that packet flow to allocate more resources to other packet flows, it can do so by making one cancellation request.

Another aspect of the invention's utility may be seen in a common scenario that complicates the straightforward transmission case illustrated in FIGS. 3A and 3B. FIG. 4A starts off identically to FIG. 3A with the application program 135 requesting a data transmission. When the request gets down to the TCP/IP driver 204, however, (Step 5), the TCP/IP driver decides to process the IRP by means of multiple NDIS packets, rather than the single NDIS packet of FIG. 3A. There are several possible reasons why the TCP/IP driver may decide to do this. As one example, the amount of data in the IRP may be too great to fit into one packet on the LAN 171. The multiple NDIS packets are passed one by one down the stack to be processed separately by the lower-level protocol drivers. FIG. 4B follows the notifications of the packets' transmissions as they are sent one by one up the hierarchical stack. Note that in Step 4, the TCP/IP driver can only complete the processing of the original IRP when it has received transmission notifications for all of the NDIS packets that came from that IRP.

In the multiple NDIS packet scenario of FIGS. 4A and 4B, the TCP/IP driver 204 assigns the same cancel identifier to every NDIS packet resulting from the IRP. If the TCP/IP driver needs to cancel the IRP, it simply tells the drivers below it in the hierarchy to cancel all NDIS packets whose cancel identifiers match the one it passes down. At each level, the driver removes the matching NDIS packet from its queue (if it has one), repeats the cancellation request to the driver below it, and sends to the driver above it an indication for each NDIS packet that the transmission request is complete with status CANCELED.

The invention may be practiced by an application program rather than, or in addition to, a high-level driver. The application program assigns cancel identifiers to its data transmission requests. The drivers in the hierarchy, however, may choose to divide the original transmission request into subrequests (see discussion accompanying FIGS. 4A and 4B) and associate the cancel identifier of the original request with all of its subsidiary requests. The application can then cancel its request in the same manner as described above for the high-level driver: it passes down the cancel identifier and each driver in the stack cancels its work related to that cancel identifier.

Regardless of whether the cancellation request originates at the application program or at a high-level driver, it may not always be possible to fully comply with the request. Data may have already been transmitted onto the LAN 171 or have been sent to a NIC that does not act on cancellation requests. The cancellation request is processed in a best effort, rather than as an assured success, manner.

Because cancellation requests based on a cancellation identifier clear all the queues of work associated with the cancellation identifier, they return much more quickly than cancellation requests whose processing includes waiting for queues to empty. This speed is of great importance if the application program is shutting down or if the computer is rebooting.

Conclusion

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. The invention may also be practiced on non-"WINDOWS" machines and on any kind of communications link, including wireless networks. Therefore, the invention as described herein contemplates all such embodiments as may come within the scope of the following claims and equivalents thereof.

We claim:

1. In a computer with a stack of input/output drivers, a method for canceling a request for a transmission of data, the request for the transmission of data being handled by drivers in the stack, one input/output driver being higher in the stack than another input/output driver, the method comprising:
    associating, by a high-level input/output driver a cancel identifier with the request for the transmission of data;
    requesting service of a lower-level input/output driver, where the request for service includes the cancel identifier;
    requesting that the lower-level input/output driver cancel the request for service, the request for service identified by the associated cancel identifier; and
    canceling the request for service if the lower-level input/output driver determines that the request for service can still be canceled,
    whereby the high-level input/output driver cancels the request for the transmission of data,
    wherein the step of associating comprises associating a cancel identifier that has been used with another request for a transmission of data.

2. The method of claim 1 wherein the step of associating comprises associating the same cancel identifier with all packets in one packet flow.

3. The method of claim 1 further comprising the step of the lower-level input/output driver notifying the high-level input/output driver whether the request for service was canceled.

4. The method of claim 1 wherein the step of requesting service comprises making multiple requests for service of the lower-level input/output driver, where each of the multiple requests for service includes the associated cancel identifier.

5. The method of claim 4 wherein the step of canceling the request for service comprises determining and canceling each of the multiple requests for service associated with the cancel identifier.

6. The method of claim 5 further comprising the step of the lower-level input/output driver notifying the high-level input/output driver whether each of the multiple requests for service was canceled.

7. In a computer with a stack of input/output drivers, a method for canceling a request for a transmission of data, the request for the transmission of data being handled by drivers in the stack, one input/output driver being higher in the stack than another input/output driver, the method comprising:
    associating a cancel identifier with the request for the transmission of data wherein the cancel identifier has been used with another request for a transmission of data;
    requesting service of the lower-level input/output driver, where the request for service includes the cancel identifier;
    requesting that the lower-level input/output driver cancel the request for service, the request for service identified by the associated cancel identifier; and canceling the request for service if the lower-level input/output driver determines that the request for service can still be canceled, whereby the high-level input/output driver cancels the request for the transmission of data.

8. The method of claim 7 wherein the step of associating is performed by an application program.

9. The method of claim 7 wherein the step of associating is performed by the high-level input/output driver.

10. The method of claim 7 wherein the step of associating comprises associating the same cancel identifier with all packets in one packet flow.

11. The method of claim 7 further comprising the step of the lower-level input/output driver notifying the high-level input/output driver, whether the request for service was canceled.

12. The method of claim 7 wherein the step of requesting service comprises making multiple requests for service of the lower-level input/output driver, where each of the multiple requests for service includes the associated cancel identifier.

13. The method of claim 12 wherein the step of canceling the request for service comprises determining and canceling each of the multiple requests for service associated with the cancel identifier.

14. The method of claim 13 further comprising the step of the lower-level input/output driver notifying the high-level input/output driver whether each of the multiple requests for service was canceled.

15. A computer-readable medium containing instructions for performing a method for canceling a request for a transmission of data, the request for the transmission of data being handled by drivers in a stack of input/output drivers, one input/output driver being higher in the stack than another input/output driver, the method comprising:

associating a cancel identifier with the request for the transmission of data wherein the cancel identifier has been used with another request for a transmission of data;

requesting service of the lower-level input/output driver, where the request for service includes the cancel identifier;

requesting that the lower-level input/output driver cancel the request for service, the request for service identified by the associated cancel identifier; and canceling the request for service if the lower-level input/output driver determines that the request for service can still be canceled, whereby the high-level input/output driver cancels the request for the transmission of data.

* * * * *